Aug. 25, 1953 G. M. LARKIN 2,649,853
BUN WARMER
Filed July 7, 1952

INVENTOR.
GLENN M. LARKIN.
BY
*Lockwood, Galt, Woodard & Smith*
ATTORNEYS

Patented Aug. 25, 1953

2,649,853

UNITED STATES PATENT OFFICE 2,649,853

BUN WARMER

Glenn M. Larkin, Quincy, Mich., assignor of one-half to Charles R. Larkin, Toledo, Ohio Application July 7, 1952, Serial No. 297,525

2 Claims. (Cl. 126—381)

This invention relates generally to barbecuing or roasting devices and more particularly it relates to combined wiener roasting and bun warming devices.

The prior art discloses wiener roasters comprising various types of rotating wiener holders for cooking wieners in front of a heating device such for example as a gas flame or an electrical heater. In combination with such wiener cooking devices there have been provided warming chambers or boxes mounted on top of the cooking mechanism for keeping the buns warm until such a time as they are extracted for dispensing cooked wieners. Buns of the character customarily used for dispensing wieners require a certain amount of moisture to keep them in proper condition, but previous bun warming devices have been defective in that moisture has condensed within the bun warmer device and dropped into contact wtih the buns thereby making them exceedingly moist and thus undesirable as a food item.

Accordingly, the principal object of this invention is to provide a bun warming device adapted to maintain wiener buns in proper condition with respect to moisture content.

Another object of this invention is to provide a wiener bun warming device having means adapted to control the amount of moisture entering the bun warmer and means for preventing condensed moisture from coming into contact with the buns.

In accordance with this invention there is provided a bun warming device comprising a base member adapted to fit over the top of a bun roasting machine, said base member comprising a pan adapted to contain water, a baffle over the pan having apertures adapted to control the amount of vapor entering the bun warmer, a tray adapted to hold the buns in spaced relation to the baffle, a cover hinged to the pan and extending within the pan, and a moisture shield beneath the cover and over the bun tray for preventing moisture from dripping on the buns in the tray.

The full nature of the invention will be understood from the accompanying drawings and the following description and claims:

Fig. 1 of the drawings is a perspective view illustrating a combined wiener roaster and bun warmer.

Figure 1:
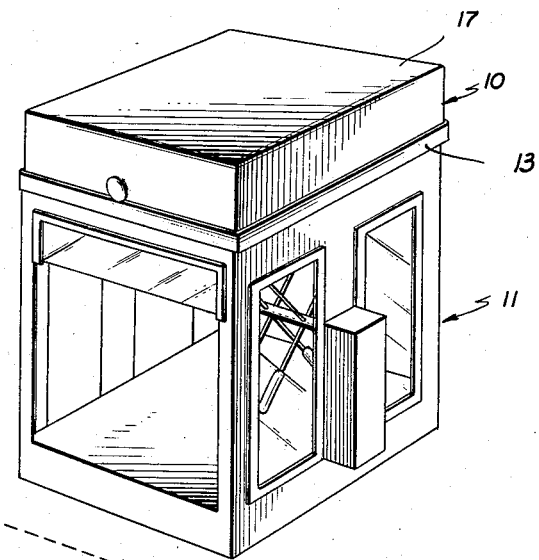

Referring to the drawings, there is provided in accordance with this invention a bun warmer 10 adapted to rest on and cooperate with a wiener roaster 11. Bun warmer 10 comprises a pan 12 which is adapted to rest directly on top of the wiener roaster 11 there being provided lips 13 around the lower edge of pan 12 for holding it from lateral movement with respect to the roaster 11. Pan 12 is adapted to contain a small amount of water which may be heated from the electrical heating element 14 of the roaster 11. For controlling the amount of vapor given off by the water in the pan 12 there is provided a baffle member 15 having a predetermined number of apertures 16 therein for permitting the proper amount of vapor to enter the chamber above the baffle 15.

The chamber above baffle 15 is enclosed by means of a cover 17 which may be hinged to pan 12 as at 18 for pivotal movement as illustrated in the drawings. It is to be noted that the lower edges of the cover 17 rest within the side walls of the pan 12. The purpose of this construction is to insure that any moisture, falling from the interior walls of the cover 17, will be returned to the pan 12 as it condenses thereby maintaining the supply of water in the pan 12 relatively constant.

In conventional bun warmers, moisture naturally condenses on the inner surfaces of the cover 17, especially on the inner surface of the top of cover 17. It is only natural that such moisture then drips on the buns within the warmer. In order to prevent such dripping there is provided in accordance with this invention a baffle 20 which may be fastened at each end and midway of the sides by means of bolts 21. Spacers 22 on bolts 21 may be dimensioned to suspend the baffle 20 in such a manner that it slopes toward the rear of cover 17. The baffle 20 is also formed so that each side thereof slopes from bolts 21 downwardly to the sides of cover 17 whereby moisture, collecting on the upper surface of the baffle, drains until it contacts the lips 23 at the sides of baffle 20, whereupon the moisture drains toward the back of cover 17 and falls downwardly and into pan 12. The baffle 20 may be provided with a predetermined number of apertures 25 which permit a measured amount of vapor to enter the space between the baffle 20 and top of cover 17 thereby further to insure that buns in the warmer have the proper moisture content. This space will naturally be at a lower temperature than the space within or beneath the baffle 20 whereupon the vapor condenses and drains as described.

Figure 3:
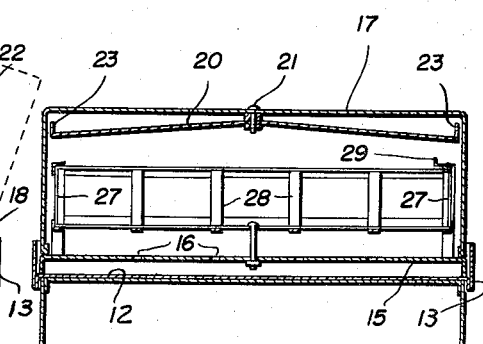
Fig. 3 is a cross section taken on line 3—3 of Fig. 2.
Figure 2:
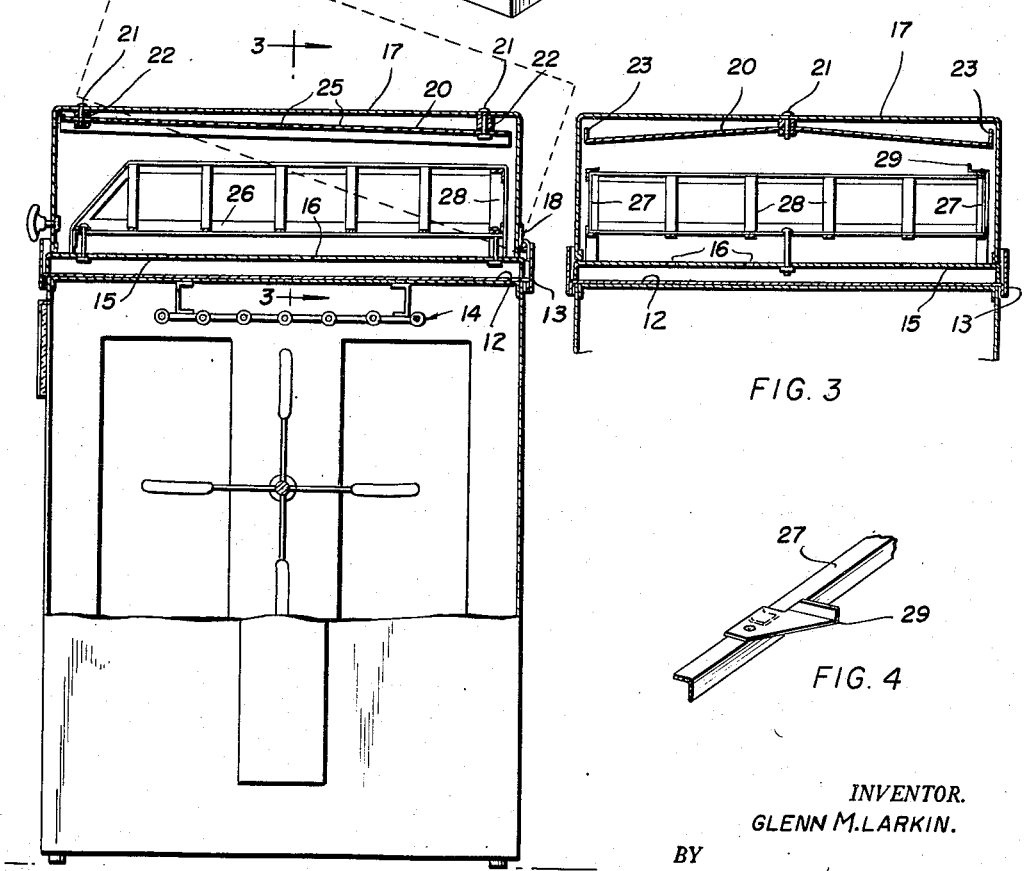
Fig. 2 is a side elevation view, partially in cross section, of the combined bun warmer and wiener roaster illustrated in Fig. 1.
Figure 4:
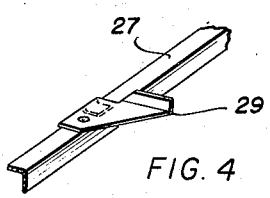
Fig. 4 is an enlarged, detailed perspective of a cover stop mechanism shown in Fig. 3.

For holding a quantity of buns in the bun warmer there is provided a tray 26 mounted on baffle 16 and having side and end frames 27 and 28. For holding cover 17 in an open position, a stop 29 may be pivoted on frame 27 for movement to an outer position (shown in Fig. 4) or to an inner position (shown in Fig. 3).

In operation, buns may be deposited on the tray 26 and thus they are kept warm by the heat from the heating element 14. At the same time there is a constant supply of vapor from the pan 12 which keeps the buns in proper condition as far as moisture is concerned.

From the foregoing description it will be apparent there is provided in accordance with this invention a bun warming device which is adapted to keep buns warm and to provide a proper moisture condition for buns such as those which are usually sold in combination with wieners. Additionally, the buns are kept from becoming exceedingly moist by means of the baffles 15 and 20 as described hereinbefore.

The invention claimed is:

1. A bun warming device for use in combination with a barbecue appliance and comprising a pan having upstanding sides adapted to contain a quantity of water, a first baffle covering said pan for controlling the rise of vapor from said pan, a bun tray disposed over said baffle, a cover hingedly connected to one side of said pan for completely covering said bun tray, said pan and said cover providing in combination an enclosure for said tray whereby vapor generated by heating said pan will be retained inside such enclosure, said cover having a top and depending sides which are located inside the perimeter of said pan whereby condensate developed inside said cover will drain into said pan, one of said cover sides provided along the lower marginal edge with a hinge construction which is attached to the inside upper portion of said one pan side whereby the lower edge of said one cover side will at all times be disposed inside said one pan side, and a second baffle mounted on the underside of said cover top and having side lips for draining condensate toward the hinged side of said cover, said second baffle having its central portion higher than the side lip portions whereby liquid will flow toward said lips, and further being continuously sloped from the side opposite said hinge construction toward said hinged cover side, said cover and said second baffle being so arranged that as said cover is being manipulated to open position droplets of condensate falling from said cover top will be deflected by said second baffle toward the hinged side of said cover thereby preventing such droplets from falling straight down onto said bun tray.

2. A bun warming device for use in combination with a barbecue appliance and comprising a pan having upstanding sides adapted to contain a quantity of water, a first baffle covering said pan for controlling the rise of vapor from said pan, a bun tray disposed over said baffle, a cover hingedly connected to one side of said pan for completely covering said bun tray, said pan and said cover providing in combination an enclosure for said tray whereby vapor generated by heating said pan will be retained inside such enclosure, said cover having a top and depending sides which are located inside the perimeter of said pan whereby condensate developed inside said cover will drain into said pan, one of said cover sides being provided along the lower marginal edge with a hinge construction which is attached to the inside upper portion of said one pan side whereby the lower edge of said one cover side will at all times be disposed inside said one pan side, and a second baffle mounted on the underside of said cover top and having side lips for draining condensate toward the hinged side of said cover, said second baffle having its central portion formed into a longitudinally extending ridge higher than the side lip portions whereby liquid will flow toward said lips, and further being continuously sloped from the side opposite said hinge construction toward said hinged cover side, said cover and said second baffle being so arranged that as said cover is being manipulated to open position droplets of condensate falling from said cover top will be deflected by said second baffle toward the hinged side of said cover thereby preventing such droplets from falling straight down onto said bun tray.

GLENN M. LARKIN.

References Cited in the file of this patent

UNITED STATES PATENTS

| Number | Name | Date |
|--------|------|------|
| 78,587 | Fuller | June 2, 1868 |
| 200,575 | Shepard et al. | Feb. 19, 1878 |
| 365,915 | Fowble | July 5, 1887 |
| 404,871 | Schroyer et al. | June 11, 1889 |
| 747,438 | Kaul | Dec. 22, 1903 |
| 749,993 | Johnson | Jan. 19, 1904 |
| 1,357,011 | Trescott | Oct. 26, 1920 |